United States Patent [19]
Lee

[11] Patent Number: 5,172,241
[45] Date of Patent: Dec. 15, 1992

[54] RECORDING/PLAYBACK SYSTEM FOR VCR

[75] Inventor: Seung E. Lee, Kyungki, Rep. of Korea

[73] Assignee: Goldstar Co., Ltd., Seoul, Rep. of Korea

[21] Appl. No.: 502,126

[22] Filed: Mar. 30, 1990

[30] Foreign Application Priority Data

Mar. 31, 1989 [KR] Rep. of Korea ............... 4243/1989

[51] Int. Cl.$^5$ ............................................. H40N 7/16
[52] U.S. Cl. ..................................... 358/335; 380/5; 360/33.1; 358/310; 358/320
[58] Field of Search .............. 358/335, 337, 310, 320; 360/33.1, 36.1; 380/5

[56] References Cited

U.S. PATENT DOCUMENTS 4,635,112 1/1987 Tomioka et al. ............... 360/33.1
4,879,611 11/1989 Fukui et al. .................... 358/335

Primary Examiner—Tommy P. Chin
Assistant Examiner—Khoi Truong

[57] ABSTRACT

A recording and playback system for code recording of VCR which comprises a synchronous separator, an ½ frequency demultiplier, a microcomputer, a comparator, a control pulse amplifier, a key matrix, a control circuit, a control head, a pulse generating head, and particularly at least demultiplier, transistor, switch, and resistor, whereby it is made to record a code in initial stage of recording, whereby it can be reproduced only when decoding the code in the initial stage of reproducing, while in a state of not selecting a code mode, it operates as similar as the conventional VCR, and even if one knows the code, the code cannot be decoded in other VCR having not the decoding function whereby it cannot be reproduced normally, whereby complete secret preservation can be kept, while in the normal mode being of not code mode, it operates similarly as the conventional system so that it can be easily applied to conventional system.

4 Claims, 5 Drawing Sheets

RECORDING/PLAYBACK SYSTEM FOR VCR

BACKGROUND OF THE INVENTION

1. Field of the Invention

The present invention relates to a recording and playback system for a video cassette recorder (hereinafter "VCR"), wherein a code is recorded in the tape during recording and then the normal playback can be performed only when the code is decoded in reproducing and more particularly, to a recording and playback system for code recording of a VCR in which a control pulse is transformed by the code and recorded in the tape so that the tape is impossible to be reproduced by a general VCR.

2. Description of the Prior Art

FIG. 3 is a block diagram of a recording and playback system of a conventional VCR. As shown in FIG. 3, such system includes a video signal input terminal VI connected through a synchronous separator 1 and an ½ frequency demultiplier 2 to a recording terminal $a_1$ of a recording and playback changing switch $SW_1$, a control head 8 connected to a movable terminal of a recording and playback changing switch $SW_1$, a recording terminal $a_1$ of the recording and playback changing switch $SW_2$ connected through a control pulse amplifier 5 to a recording terminal b of the recording and playback switch $SW_1$, a movable terminal of the recording and playback changing switch $SW_1$ connected to a control pulse input terminal co of a microcomputer 3, an input terminal of a comparator 4 and a recording terminal $a_2$ of the switch $SW_2$, a key matrix 6 having a various functional switches $SW_3$-$SW_5$ connected to an input terminals $I_1$-$I_4$. of the microcomputer 3, and an output terminal of the comparator 4 connected to an input terminal of a control circuit 7, wherein the recording and playback changing switches $SW_1$ and $SW_2$ are short-circuited to the recording and playback terminals $a_1$ and $a_2$ in case of recording, and also, are short-circuited to the playback terminals $b_1$ and $b_2$ in case of reproducing, respectively. Therefore, the recording and playback changing switches $SW_1$ and $SW_2$ are respectively short-circuited to their recording terminals $a_1$ and $a_2$ upon recording, wherein a synchronizing signal of a video signal inputted to the input terminal VI of the video signal is separated from the synchronous separator 1 and then is ½ frequency demultiplied at the ½ frequency demultiplier 2 thereby being outputted as a control pulse of 30 Hz. The control pulse of 30 Hz is applied through the recording and playback changing switches $SW_1$ and $SW_2$ to the control head 8 and is recorded, wherein the control pulse of 30 Hz passed through the recording and playback changing switch $SW_1$ is applied to the control pulse input terminal co of the microcomputer 3 and used as a control signal of time editing and the like, and also the control pulse of 30 Hz is applied to the comparator 4 as a reference signal.

On the other hand, in case of playback, the recording and playback changing switches $SW_1$ and $SW_2$ are short-circuited, respectively, to their playback terminals $b_1$ and $b_2$, wherein the control pulse of 30 Hz reproduced at the control head 8 is passed through the recording and playback changing switch $SW_2$ and amplified at a control pulse amplifier 5 and thereafter applied through the recording and playback changing switch $SW_1$ to the control pulse input terminal co of the microcomputer 3 and to the input terminal of the comparator 4, and accordingly is controlled similar to recording.

In, such a conventional system, since a device capable of recording and decoding the code is not provided, a user cannot record a tape which only the users can reproduce and therefore, security preservation of the tape is difficult.

Furthermore, in other conventional systems, since the system and method for recording the code and decoding the code are complicated, difficulty in practical application is accompanied therewith, and particularly in cases when other people know the code, one disadvantage is that the tape can be normally reproduced utilizing other VCR's having a decoding function.

SUMMARY OF THE INVENTION

Accordingly, it is an object of the present invention to provide an improved recording and playback system for code recording in a VCR, wherein a code is recorded at the initial stage of the recording and the normal playback operation can be carried out only by decoding the code at the initial stage of the reproducing and in a state that a code mode is not selected, it operates as similar as a conventional VCR, and even if the code is known, the code cannot be decoded in another VCR having a decoding function, thereby facilitating security of the videotape.

Another object of the present invention is to provide a recording and playback system executing the recording and playback as same as the conventional VCR in a state that a code mode is not selected, in case when a code is established in a state that a code mode is selected at the initial stage of recording, outputting a control pulse of 60 Hz having double period bigger than the control pulse of the existing 30 Hz. This control pulse of 60 Hz is applied to a control head with a predetermined delay time according to the established code value being recorded, and then the control pulse of the 60 Hz is continuously applied to the control head and rendering to execute normal recording, and in case when the code mode is established at the initial stage of reproducing, the control pulse of 60 Hz recorded at the time of recording is reproduced, a time during the control pulse of 60 Hz being generated at the initial stage of the reproducing is calculated, and then in case when the calculated value becomes equal to the value of the established code, the control pulse of 60 Hz reproduced thereafter is converted to the control pulse of 30 Hz and thereby allowing execution of the playback operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a recording and playback system for code recording of VCR which comprises a synchronous separator, an ½ frequency demultiplier, a microcomputer, a comparator, a control pulse amplifier, a key matrix, a control circuit, a control head, a pulse generating head, and a demultiplier, transistor, switch, and resistor, for recording a code in an initial stage of recording, whereby it can be reproduced only when decoding the code in the initial stage of reproducing, while in a state of not selecting a code mode, it operates as similar the conventional VCR, and even if one knows the code, the code cannot be decoded in other VCR having not the decoding function whereby it cannot be reproduced normally, whereby complete secret preservation can be kept, while in the normal mode being of not code mode, it operates similarly as the conventional system so that it can be easily applied to a conventional system.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
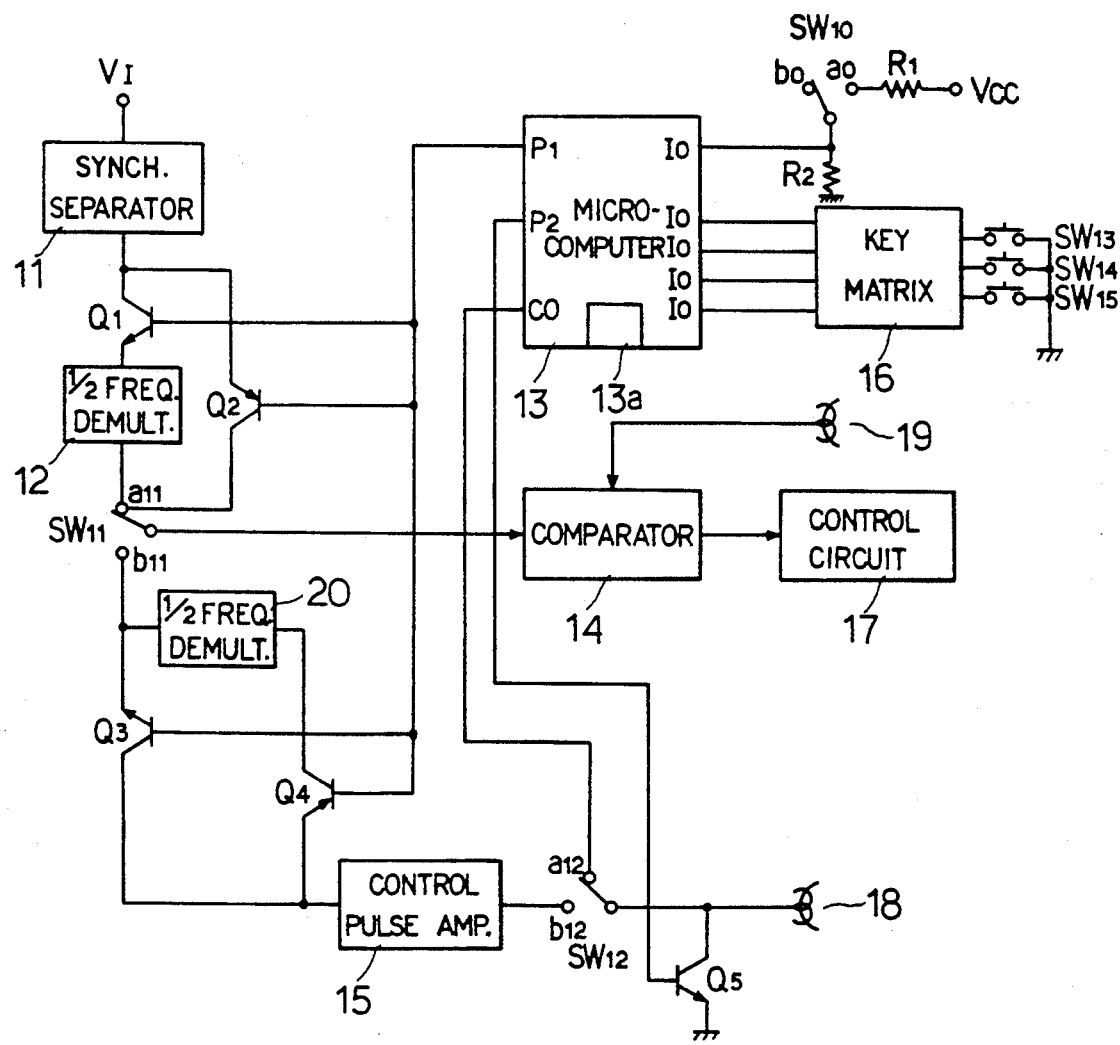
FIG. 1 is a circuit diagram of the recording and playback system for code recording of a VCR of the present invention.

Referring now in detail to the drawings for the purpose of illustrating preferred embodiments of the present invention, FIG. 1 is a circuit diagram of a recording and playback system for a code recording of a VCR of the present invention. The recording and playback system includes a video signal input terminal VI connected through a synchronous separator 11 to a collector of transistor $Q_1$ and to an emitter of transistor $Q_2$, wherein the emitter of the transistor $Q_1$ is connected through a $\frac{1}{2}$ frequency demultiplier 12 to a recording terminal $a_{11}$ of a recording and playback changing switch $SW_{11}$ as well as the collector of the transistor $Q_2$ connected to the recording terminal $a_{11}$ of the recording and playback changing switch $SW_{11}$, a control head 18 connected to a movable terminal of a recording and playback changing switch $SW_{12}$, and a playback terminal $b_{12}$ of the control head 18 connected through a control pulse amplifier 15 to a collector of transistor $Q_3$ and to an emitter of transistor $Q_4$, wherein the emitter of the transistor $Q_3$ is connected to a playback terminal $b_{11}$ of the recording and playback changing switch $SW_{11}$ as well as the collector of transistor $Q_4$ connected through an $\frac{1}{2}$ frequency demultiplier 20 to the playback terminal $b_{11}$ of the recording and playback changing switch $SW_{11}$, the movable terminal of the recording and playback changing switch $SW_{11}$ connected to a control pulse input terminal co of the microcomputer 13, an input terminal of a comparator 14, and the recording terminal $a_{12}$ of the recording and playback changing switch $SW_{12}$, a key matrix 16 having various functional switches $SW_{13}$-$SW_{15}$ connected to input terminals $I_1$-$I_4$ of the microcomputer 13, a normal terminal bo of a code/normal mode selection switch $SW_{10}$ connected to ground as well as a code terminal ao connected through a resistor $R_1$ to a power supply terminal Vcc, a movable terminal of the code/normal mode selection switch $SW_{10}$ connected to a resistor $R_2$ and a code mode input terminal $I_0$ of the microcomputer 13, an output terminal $P_2$ of the microcomputer 13 connected to a base of transistor $Q_5$, a collector of the transistor $Q_5$ connected to a mode of the recording and playback changing switch $SW_{12}$ and control head 18, and an output terminal $P_1$ of the microcomputer 13 connected to the bases of the transistors $Q_1$-$Q_4$. Memory means 13a stores a program for microcomputer 13.

The recording and playback changing switches $SW_{11}$ and $SW_{12}$, are short-circuited respectively to their recording terminals $a_{11}$ and $a_{12}$, in case of the recording and is short-circuited respectively to their playback terminals $b_{11}$ and $b_{12}$, in case of playing back, the code/normal mode selection switch $SW_{10}$ is short-circuited to its code terminal ao in case of selecting the code mode and is to be switched to its normal terminal bo in case of selecting the normal mode. Furthermore, the microcomputer 13 is in normal mode when a low potential is input to its code mode input terminal Io thereby executing a program according to the normal mode, that is, a high potential signal is output from output terminal $P_1$ and low potential signal is output from output terminal $P_2$, and the microcomputer 13 is in code mode when a high potential signal is inputted to its code mode input terminal $I_0$ thereby executing the program in response to the code mode, that is, a low potential signal is output from output terminal $P_2$ for a predetermined time period according to the established value of the code, only in the initial stage of recording and thereafter outputting the low potential signal. The low potential signal is output from output terminal $P_2$ in the reproducing state and the high potential signal is outputted for a predetermined time period to output terminal $P_1$ at its initial stage of reproducing and then outputting the low potential signal.

On the other hand, various functional switches $SW_{13}$-$SW_{15}$ are used as a primary functional switch in the normal mode selection state. The functional switches $SW_{13}$-$SW_{15}$ are used respectively as code establishing switch, shifting switch and up-switch in the code mode selection state.

Figure 2A:
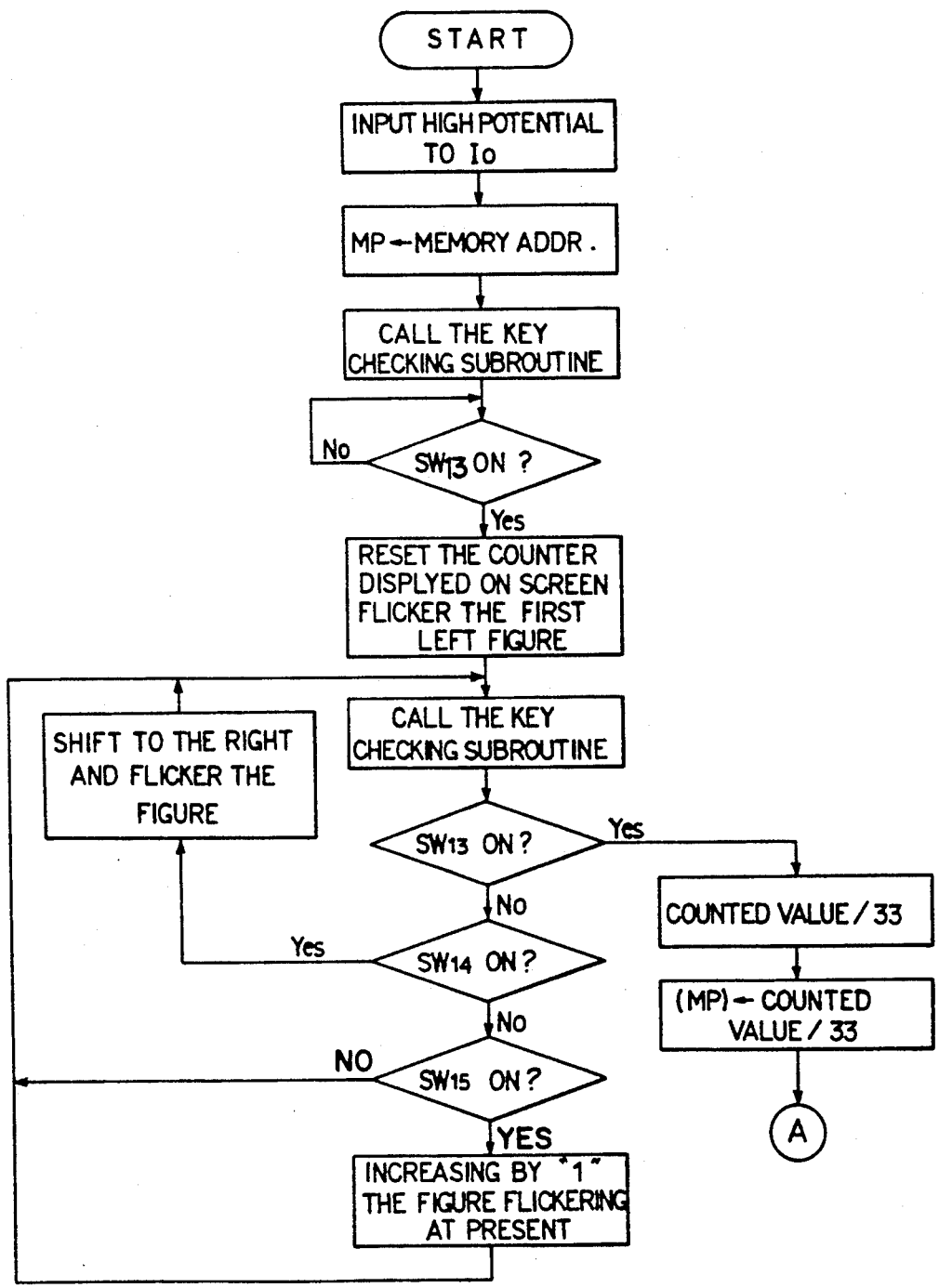
FIGS. 2(a) through 2(c) is a control chart of illustrating the operational program of the present invention.
Figure 2B:
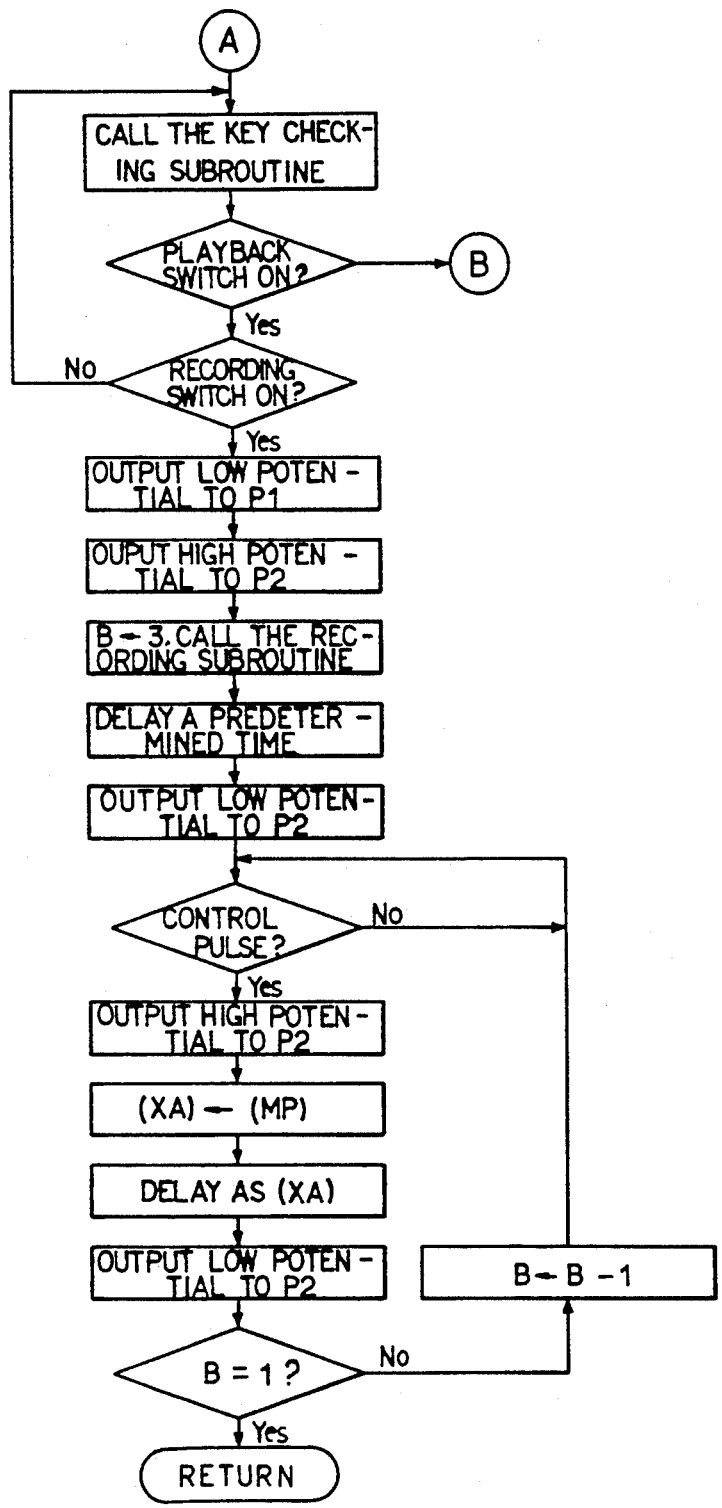
Figure 2C:
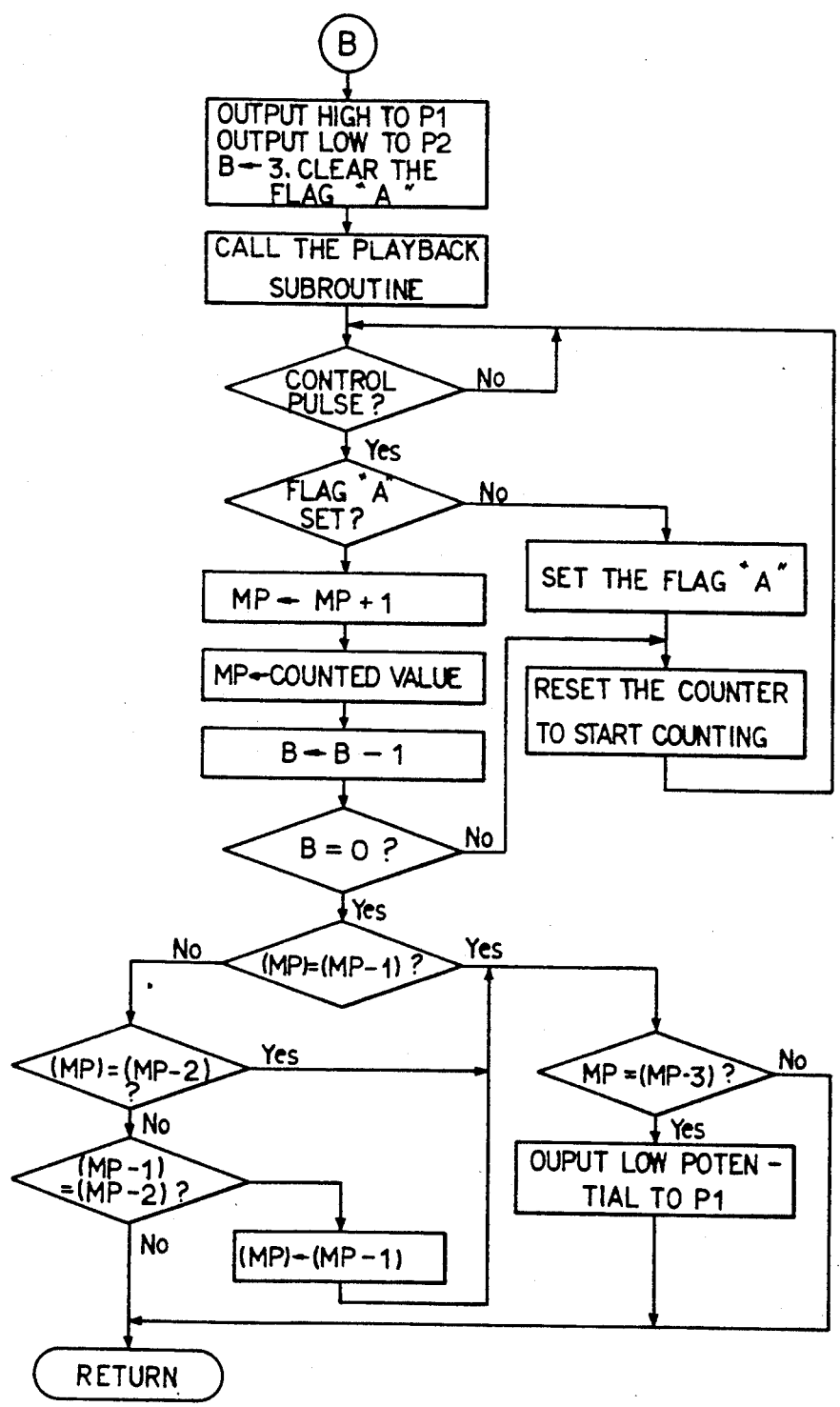

FIGS. 2(a) through 2(c) is a flow chart of control for illustrating the operational process of FIG. 1. The operation and effect of the present invention will be described in detail with reference to this control flow chart as followings.

Figure 3:
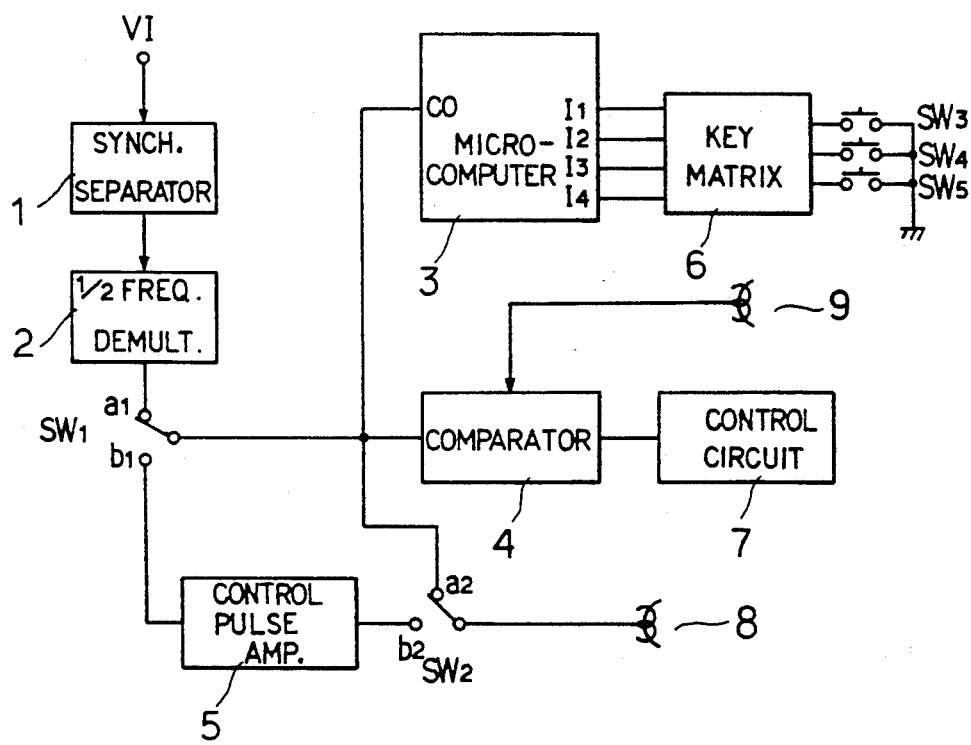
FIG. 3 is a circuit diagram of a recording and playback system of a conventional VCR.

When the code/normal mode selection switch $SW_{10}$ is short-circuited to the normal terminal bo, a low potential signal which is a ground potential is inputted to the code mode input terminal Io of the microcomputer 13, the microcomputer judges as a normal mode and outputs a high potential signal to its output terminal $P_1$. Therefore the transistors $Q_1$ and $Q_3$ are turned on, while the transistors $Q_2$ and $Q_4$ are turned off, wherein the low potential signal is outputted to the output terminal $P_2$ of the microcomputer 13 and therefore the transistor $Q_5$ is turned off. Accordingly, the output side of the synchronous separator 11 is connected through the transistor $Q_1$ and the $\frac{1}{2}$ frequency demultiplier 12 to the recording terminal $a_{11}$ of the recording and playback changing switch $SW_{11}$, and the output side of the control pulse amplifier 15 is connected through the transistor $Q_3$ to the recording terminal $b_{11}$ of the recording and playback changing switch $SW_{11}$ and consequently being operated as similar as the explanation of FIG. 3.

On the other hand, when the code/normal mode selection switch $SW_{10}$ is short-circuited to the code terminal ao, a high potential signal which is a power source of the power supply terminal Vcc is inputted to the code mode input terminal Io of the microcomputer 13, the microcomputer 13 recognizes code mode and executes the program in response to the code mode. That is, executing the code key subroutine and receiving a code by key inputting. Thereafter, executing a key checking subroutine, executing a code playback subroutine if the playback switch is in a pressed state, and executing the code recording subroutine if the recording switch is in a pressed state and thereafter returning to the original program, and if either the recording or playback switch is not pressed, then executing repeatedly the key checking subroutine.

At first, designating a memory address to record a code to a memory point MP of the memory means 13a, executing the key checking subroutine, and if the code setting switch $SW_{13}$ is pressed, resetting the counter for displaying on the screen, and rendering to flicker the first figure of left side on the screen. The flickering of the figure means that the figure is possible to set voluntarily by the up-switch $SW_{15}$.

In such state, at every time the up-switch $SW_{15}$ is pressed, counting it at the counter whereby increasing the presently flickering first figure by "1". Thereafter, the shift switch $SW_{14}$ is pressed, shifting to the right side of the presently flickering figure whereby flickering the second figure. In this state, counting it at the counter at ever time the up-switch $SW_{15}$ is pressed thereby becoming to increase the presently flickering second figure by "1".

Thus, pressing the shift switch $SW_{14}$ and when pressing the upswitch $SW_{15}$, and accordingly counting the value of its digit at the counter and becoming to display on the screen, a user becomes possible to set code of any digit number by the shift switch $SW_{14}$ and the up-switch 15 while watching the figure displayed on the screen.

And thereafter, when the code setting switch $SW_{13}$ is pressed, dividing the value counted at the counter by 33 and thereafter becoming to record the integral value to the designated address of the memory pointer MP as a code value. The reason of giving the dividing value to 33 is for the purpose of rendering to correspond with the interval 33.3 ms that the synchronous signal is outputted from the synchronous separator 11.

Thus, when recording the code value and then the recording switch is turned on, the microcomputer 13 outputs a low potential signal to its output terminal $P_1$ whereby turning the transistors $Q_2$ and $Q_4$ on, turning the transistors $Q_1$ and $Q_3$ off, and outputting a high potential signal to its output terminal $P_2$ whereby turning the transistor $Q_5$ on.

Therefore, at this moment, the synchronous signal of 60 Hz outputted from the synchronous separator 11 is applied through the transistor $Q_2$ to the recording terminal $a_{11}$ of the recording and playback changing switch $SW_{11}$ as a control pulse. And, at this moment, since it is in the recording state, the recording and playback changing switches $SW_{11}$ and $SW_{12}$ are respectively short-circuited to their recording terminals $a_{11}$ and $a_{12}$, accordingly, the control pulse of 60 Hz applied to the recording terminal $a_{11}$ of recording and playback changing switch $SW_{11}$ becomes to flow to the ground through the recording and playback changing switches $SW_{11}$ and $SW_{12}$ and the transistor $Q_5$.

Thereafter, the microcomputer 13 stores the repeating time number of "3" into its internal register B and thereafter at the time that a predetermined delay time has elapsed, outputting a low potential signal to its output terminal $P_2$ whereby turning the transistor $Q_5$ off. The control pulse of 60 Hz passed through the recording and playback changing switch $SW_{11}$ is inputted to the control pulse input terminal co of the microcomputer 13, at the same time, being applied to the control head 18 through the recording and playback changing switch $SW_{12}$ thereby being recorded.

By the way, the microcomputer 13 outputs a high potential to its output terminal $P_2$ when the microcomputer 13 senses the control pulse being inputted to its control pulse input terminal co whereby transistor $Q_5$ is turned on, and only one control pulse is applied to the control head 18 in order to commence recording.

And thereafter, the microcomputer 13 reads out the code value recorded at the memory pointer MP and then storing to its internal accumulator XA, and delaying the time as much as its stored code value and then outputting a low potential signal to its output terminal $P_2$ whereby turning the transistor $Q_5$ off, and thereafter reading the repeating time number value of the register B whereby judging whether or not it is "1", if it is not "1", subtracting "1" from the repeating time number value and then storing again to the register B. That is, at this moment, the repeating time number value "2" is stored to the register B. At this moment, since the transistor $Q_5$ is in OFF-state, the control pulse of 60 Hz passed through the recording and playback changing switch $SW_{11}$ is inputted to the control pulse input terminal co of the microcomputer 13, at the same time, being applied to the control head 18 through the recording/playback changing switch $SW_{12}$ thereby being recorded.

Therefore, the microcomputer 13 outputs a high potential to its output terminal $P_2$ and executing repeatedly the process after the turning ON the transistor $Q_5$, delaying the time as much as the code value and thereafter making the control pulse of 60 Hz to be applied to the control head 18 thereby being recorded.

Thus, after delaying the time as much as the code value, when repeating three times that of recording by applying the control pulse of 60 Hz to the control head 18, that is, when the repeating time number value of the register B becomes "1", the control pulse of 60 Hz becomes continuously applied to the control head 18 thereby becoming to execute the normal recording.

That is, at this moment, a low potential signal is outputted to the output terminal $P_2$ of the microcomputer 13 whereby the transistor $Q_5$ is maintained in the OFF-state, and wherein the control pulse of 60 Hz passed through the recording and playback changing switch $SW_{11}$ is continuously applied to the control head 18 through the recording and playback changing switch $SW_{12}$ thereby becoming to execute continuous recording.

On the other hand, when the playback switch is turned on after thus recording the code value, the microcomputer 13 outputs the high potential to its output terminal $P_1$ whereby turning the transistors $Q_1$ and $Q_3$ on, and turning the transistors $Q_2$ and $Q_4$ off, and further the microcomputer 13 stores the repeating time number value "3" to its internal register B, and after clearing a flag A, then executing the playback subroutine. That is, since it is the playback state, the switches $SW_{11}$ and $SW_{12}$ are short-circuited respectively to their playback terminals $b_{11}$ and $b_{12}$, the control pulse of 60 Hz reproduced at the playback head 18 is passed through the recording and playback changing switch $SW_{12}$ and being amplified at the control pulse amplifier 15 and thereafter being applied through the transistor $Q_3$ and the recording and playback changing switch $SW_{11}$ to the input terminal of the comparator 14 and to the control pulse input terminal co of the microcomputer 13.

Thus, in case when the control pulse is inputted to the control pulse input terminal co of the microcomputer 13, if the flag A is not set, setting the flag A, resetting the internal counter of the microcomputer 13 whereby starting to count and then returning to the step for determining whether or not the control pulse is inputted to its control pulse input terminal co. On the other hand, if the flag A is set, increasing the address of memory point MP by "1", and recording the counted value of the counter to the increased address MP+1, and thereafter reading out the repeating time number value of the register B thereby subtracting "1" and then storing again to the register B. Thereafter if the repeating time number value of the register B is not "0", resetting the counter thereby executing repeatedly again the process after the process for starting the counting by resetting the counter.

That is, after counting the time by counter from the time that the control pulse being inputted to the control pulse input terminal co of the microcomputer 13 to the time that next control pulse being inputted, increasing the address of memory point MP by "1" thereby recording to the address. The counted value counted at the counter becomes to the delay time value between two control pulses recorded in response to the code value in the initial stage of recording.

Consequently, after counting by the counter respectively the delay time recorded equally three times in response to the code value in the initial stage of recording, with increasing by "1" the address of the memory point MP, whereby becoming to record to the address.

And thereafter, determining whether or not the two counted values among three counted values recorded in the address of the memory point MP as above description are equal. That is, when it is assumed that the present address among the addresses of the memory point MP is MP, and the address of immediately before and one more before are respectively MP-1, MP-2, comparing that the counted value recorded in the address MP is similar to the counted value recorded in the address MP-1 or the address MP-2, at this moment, if it is not same, comparing again whether the counted values recorded in the addresses MP-1 and MP-2 are same one another, if they are same, recording the counted value recorded in the address MP-1 to the present address MP.

Thus, comparing the two counted values among the counted values recorded respectively in the addresses MP, MP-1 and MP-2 are equal, and when they are same, comparing whether the counted value is equal to the code value (the address recorded with the code value is MP-3) set by the code setting switch $SW_{12}$. At this moment, if they are same, outputting the low potential to the output terminal $P_1$ of the microcomputer 13 thereby executing the normal playback operation. That is, the transistors $Q_2$ and $Q_4$ are turned on by the low potential outputted to the output terminal $P_1$ of the microcomputer 13. The transistors $Q_1$ and $Q_3$ are turned off, the control pulse of 60 Hz reproduced at the control head 18 is passed through the recording and playback changing switch $SW_{12}$ and being amplified at the control pulse amplifier 15 and then passing through the transistor $Q_4$ and ½ frequency demultiplied at the ½ frequency demultiplier 20 and converted into the control pulse of 30 Hz. Since the control pulse of 30 Hz is applied to the comparator 14 as a reference signal through the recording and playback changing switch $SW_{11}$, the normal playback operation is executed.

However, in the case where the code value inputted by a user at the initial stage of reproducing is not the same with the code value recorded at the initial stage of recording, the high potential is continuously outputted to the output terminal $P_1$ of the microcomputer 13 thereby the transistors $Q_1$ and $Q_3$ are turned on. The transistors $Q_2$ and $Q_4$ stay in the OFF-state. Therefore, the control pulse of 60 Hz reproduced at the control head 18 is passed through the switch $SW_{12}$ and the control pulse of 60 Hz which is the output signal of this control pulse amplifier 15 is applied through the transistor $Q_3$ and the recording and playback changing switch $SW_{11}$ to the comparator 14 as a reference signal and becoming impossible to execute the normal playback operation. That is, since the control pulse applied to the comparator 14 as a reference signal is 60 Hz and the output signal of the pulse generating head 19 applied to the comparator 14 as a comparing signal is 30 Hz, it is impossible to execute the normal playback operation.

The present invention records a code at the initial stage of recording so that normal playback can be executed only when decoding the code at the time of reproducing. Since the control pulse is recorded with double number of the conventional system in the code mode, even if one knows the code, the normal playback cannot be executed by using conventional system, whereby further complete secret preservation can be kept. In the usual mode which is not the code mode, it is operated similarly with conventional system, and therefore, there is effect that it can be applied simply and easily to the conventional system.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A recording and playback system for code recording of a video cassette recording comprising:

means for applying the output signal of a synchronous separator to a microcomputer and a comparator through a first transistor, a first ½ frequency demultiplier and a first recording and playback changing switch, respectively, as a control pulse and a reference signal in a normal mode of said microcomputer by a code/normal mode selection switch and a key matrix as well as recording by applying the synchronous separator output signal to a control head through said first recording and playback changing switch, and applying a playback signal of said control head through a second recording and playback changing switch, control pulse amplifier, a second transistor and said first recording and playback changing switch to said microcomputer and comparator in a normal playback mode of said microcomputer; and means for applying the output signal of said synchronous separator to said microcomputer and comparator through a third transistor and said first recording and playback changing switch in a code mode of said microcomputer as well as recording by applying the synchronous separator output signal to said control head through said first recording and playback changing switch in accordance with a switching state of a fourth transistor controlled by said microcomputer, and applying a playback signal of said control head through said second recording and playback changing switch, said control pulse amplifier, a fifth transistor, a second ½ frequency demultiplier and said first recording and playback changing switch to said microcomputer and comparator in a case of reproducing the code of said microcomputer.

2. A method of recording and playing back a code recording of a video cassette recorder, comprising the steps of:

(a) determining whether the video cassette recorder is in a normal play mode or a code mode;

(b) executing a key checking routine if the video cassette recorder is in the code mode;

(c) setting a code value by a user, and recording said code value to a designated address of a microcomputer in an initial state of recording;

(d) executing a code recording subroutine if a recording switch has been activated, and executing a code playback subroutine if a playback switch has been activated;

(e) delaying a synchronous signal from a synchronous separator for a predetermined time period by a control signal of a microcomputer when said recording switch has been activated so that said synchronous signal is not applied to a control head;

(f) storing a first repeating time number in a first internal register of said microcomputer;

(g) recording said synchronous signal to said control head in response to the control signal of said microcomputer when said predetermined time period has elapsed;

(h) delaying said synchronous signal according to said code value when a control pulse is input to a control pulse input terminal of said microcomputer so that said synchronous signal is not applied to said control head;

(i) executing a normal recording mode after said steps (g) and (h) are repeated for said first repeating time number;

(j) outputting a first reproducing signal from said control head to a comparator by a control signal of said microcomputer when said playback switch has been activated;

(k) setting a second repeating time number in a second internal register of said microcomputer;

(l) counting a delay time value between two control pulses recorded in response to said code value in the initial stage of recording to said microcomputer when a control pulse is inputted to the control pulse input terminal of said microcomputer, and storing said delay time value in a designated address of said microcomputer;

(m) executing said step (1) for said second repeating time period;

(n) comparing two counted values among the counted values recorded respectively in the designated addressed for said repeating number of time; and (o) outputting a second reproducing signal from said control head through a ½ frequency demultiplier to said comparator if said two counted values are equal, and executing a normal playback mode.

3. An apparatus for recording and reproducing in a video cassette recorder, comprising:

selecting means for selecting a code mode or a normal mode;

input means for inputting a code value when the code mode has been selected;

recording mode means including,
control signal generating means for generating a control signal,
delaying means for delaying the control signal in accordance with the code value to produce a delayed code signal, and
recording means for recording the control signal and the delayed control signal, and playback mode means including,
detecting means for detecting a predetermined number of delay time values each representative of a time delay between pulses of the control signal and corresponding pulses of the delayed control signal recorded by said recording means and setting one of the detected predetermined number of delay time values, which is detected more than once, to a measured delay time value,
comparing means for comparing the measured delay time value to the code value, and
reproducing means for reproducing the control signal only if the measured delay time value equals the code value.

4. A method of recording and reproducing in a video cassette recorder, comprising the steps of:

(a) selecting a code mode or a normal mode;

(b) inputting a code value once the code mode has been selected;

(c) generating a control signal to be recorded in a recording mode;

(d) delaying the control signal in accordance with the code value to produce a delayed code signal;

(e) recording the control signal and the delayed control signal;

(f) detecting a predetermined number of delayed time values, each representative of a time delay between pulses of the control signal and corresponding pulses of the delayed control signal recorded in said step (e) and setting one of the detected predetermined number of delay time values, which is detected more than once, to a measured delayed time value, in a playback mode;

(g) comparing the measured delay time value to the code value; and (h) reproducing the control signal only if the measured delay time value equals the code value.

* * * * *